(12) United States Patent
Holleczek et al.

(10) Patent No.: US 11,474,195 B2
(45) Date of Patent: Oct. 18, 2022

(54) OPTICAL INTERFACE

(71) Applicant: Robert Bosch GmbH, Stuttgart (DE)

(72) Inventors: Annemarie Holleczek, Stuttgart (DE); Matthias Baier, Lehrensteinsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 630 days.

(21) Appl. No.: 16/495,011

(22) PCT Filed: Mar. 12, 2018

(86) PCT No.: PCT/EP2018/056055
§ 371 (c)(1),
(2) Date: Sep. 17, 2019

(87) PCT Pub. No.: WO2018/172118
PCT Pub. Date: Sep. 27, 2018

(65) Prior Publication Data
US 2020/0271750 A1     Aug. 27, 2020

(30) Foreign Application Priority Data

Mar. 20, 2017   (DE) .......................... 102017204573.6

(51) Int. Cl.
| | |
|---|---|
| *G01S 7/00* | (2006.01) |
| *G01S 7/481* | (2006.01) |
| *G01S 17/10* | (2020.01) |

(52) U.S. Cl.
CPC ............ *G01S 7/003* (2013.01); *G01S 7/4817* (2013.01); *G01S 17/10* (2013.01)

(58) Field of Classification Search
CPC ........ G01S 7/003; G01S 7/4817; G01S 17/10; G01S 17/42; H04B 10/114; H04B 10/25891; G02B 6/001
See application file for complete search history.

(56) References Cited

U.S. PATENT DOCUMENTS

| | | | |
|---|---|---|---|
| 5,535,033 A | 7/1996 | Guempelein et al. | |
| 5,991,478 A | 11/1999 | Lewis et al. | |
| 6,980,714 B2 * | 12/2005 | Lo ........................ | G02B 6/3604 |
| | | | 385/33 |
| 2004/0086222 A1 * | 5/2004 | Bowman .............. | G02B 6/3604 |
| | | | 385/26 |

(Continued)

FOREIGN PATENT DOCUMENTS

| | | |
|---|---|---|
| DE | 2441359 A1 | 3/1976 |
| DE | 4342778 A1 | 6/1995 |

(Continued)

OTHER PUBLICATIONS

International Search Report dated Jun. 25, 2018 of the corresponding international Application PCT/EP2018/056055 filed Mar. 12, 2018.

*Primary Examiner* — Jonathan M Hansen
(74) *Attorney, Agent, or Firm* — Norton Rose Fulbright US LLP; Gerard Messina

(57) ABSTRACT

An optical interface includes a light-conducting fiber having a ring section that extends annularly about a rotation axis, at least one light source for emitting light signals into the fiber via fiber coupling, which fiber is designed to radially emit the light signals from the light source, and a receiving device for receiving the light signals emitted by the fiber.

12 Claims, 3 Drawing Sheets

(56) References Cited

U.S. PATENT DOCUMENTS

| | | | |
|---|---|---|---|
| 2005/0069249 A1* | 3/2005 | Lo | G02B 19/0028 385/26 |
| 2013/0229668 A1 | 9/2013 | Werber | |
| 2016/0231585 A1 | 8/2016 | Bauco | |

FOREIGN PATENT DOCUMENTS

| | | |
|---|---|---|
| JP | S60158744 A | 8/1985 |
| JP | H0572436 A | 3/1993 |
| WO | 9918463 A1 | 4/1999 |
| WO | 2005050879 A1 | 6/2005 |

\* cited by examiner

OPTICAL INTERFACE

CROSS-REFERENCE TO RELATED APPLICATIONS

The present application is the national stage of International Pat. App. No. PCT/EP2018/056055 filed Mar. 12, 2018, and claims priority under 35 U.S.C. § 119 to DE 10 2017 204 573.6, filed in the Federal Republic of Germany on Mar. 20, 2017, the content of each of which are incorporated herein by reference in their entireties.

FIELD OF THE INVENTION

The present invention relates to an optical interface. The present invention also relates to a rotating system, which includes an optical interface, where a data transmission is enabled, in particular, in a contactless manner with the optical interface.

BACKGROUND

Rotating systems are known in the realm of technology, which transmit data from a rotating component (rotor) to a static component (stator) via interfaces. One example of such a rotating system are so-called LIDAR macro-scanners, as is described in DE 10 2006 049 935 B4. For applications in the automotive field, these macro-scanners are comparatively large, as a result of which individual components constructed in a preferably space-saving manner are desired. Since multiple data transmissions in parallel must often be ensured, additional interfaces are required. Thus, the related art provides a separate interface for each data transmission. Multiple laser sources and laser detectors, for example, must be activated, for example, 64 laser-detector pairs.

In the aforementioned patent document, it is further disadvantageous that the interfaces are situated directly on the axis. This installation space is therefore unusable for additional transmissions.

An optical interface is suitable for a preferably rapid, interference-free, and contactless transmission of data. Known interfaces for the data transmission from a rotor to a stator are classified into two categories based on their position with respect to the symmetry of the system. On the one hand, there are interfaces that are seated on the rotation axis, which are referred to as "on-axis." On the other hand, there are interfaces that include eccentrically situated transmission components, which is known as "off-axis."

Active systems such as, in particular, coupling via dynamic grids, coupling via scattering centers, fluorescent-optical rotary transmitters, infrared rotary transmitters including discrete receivers, or the like, as well as passive systems such as, in particular, coupling via notching, coupling via deformation or bending, concentric fiber bundles, interior mirror-coated half-shells, prism couplers, mirror trenches or the like are known for off-axis interface systems. However, all of these interface types are known mainly from the academic literature and are not ready for serial production. The rotation axis is frequently not accessible or the space is otherwise utilized, as a result of which alternatives are required.

One disadvantage of the aforementioned patent document is that the space in the rotation axis is not accessible or the space is otherwise utilized. If an additional signal is to be transmitted, then a new type of interface must be implemented. Other interfaces are known from DE 24 41 359 A1 or DE 43 42 778 A1. In DE 24 41 359 A1 a circular fiber-optic light guide is present, into which collimated light is irradiated. As a consequence, the light material coupling can happen only at a high loss of light output, since no adaptation of the divergence of the light into the element to be coupled is undertaken. The fiber-optic light guide seated on a rotor is thus able to emit light signals, which are detected by a stationary detector. Again, however, a high volume is required in order to implement the optical interface. DE 43 42 778 A1 describes a laterally light-emitting bundle of individual fibers. These fibers are provided with a transparent coating. The bundle of fibers is stationary, so that a detector is able to move along the bundle of fibers. The interface resulting in this way is designed for computer tomographs, so that two semi-circular signal paths result. As a result, a continuous rotation is not possible (nor desired). With the use in computer tomographs, a large installation space is available, which is also utilized according to the teaching of the noted references. A space-saving optical device is not provided.

SUMMARY

The optical interface according to the present invention allows a data transmission between a moving element and a stationary element, in particular, between a rotor and a stator. The data is transmitted during the entire movement, in particular, during the entire rotation of the rotation, continuously, contactlessly, and wearlessly. The optical interface is constructed in a cost-effective, robust, interference-free, and space-saving manner. The data transmission is designed, in particular, for signal sequences of arbitrary frequency, for example, in the two-digit kHz range. Alternatively, slower or faster signal sequences can also be transmitted. The optical interface is also designed for LIDAR macro-scanners having specific rotor diameters, a specific rotor diameter possibly also being understood to mean a smaller rotor diameter. This small rotor diameter can, for example, be less than 10 cm, ideally, less than 5 cm. The optical interface can also be used when a free forming area is used for spanning. The data coding for the transmitting and receiving of data is efficient, lossless, and without optical power conversion.

The optical interface according to the present invention includes a light-conducting fiber, at least one light source, and a receiving device. The light-conducting fiber includes a ring section that extends annularly about a rotation axis. The light-conducting fiber is, in particular, attachable to a rotor of a system. The light-conducting fiber is thus advantageously rotatable about the rotation axis. The at least one light source is designed to emit light signals into the fiber. The fiber, in turn, is used for radially emitting the light signals emitted by the light source. Light is emitted, in particular, via the physical process of scattering of light on particles in the core of the fiber. Finally, the receiving device is used to receive light signals that are emitted by the fiber. The receiving device is advantageously stationary and is attached at a position radially outside the ring section of the fiber. Thus, the receiving device is always able to receive light signals from the fiber, even when the fiber rotates about the rotation axis. The ring section ensures that an area of the fiber is always present, which is opposite the receiving device, so that the receiving device is able to continuously receive light signals. The light signals from the light source are coupled into the fiber via fiber coupling. A butt coupler known from the related art is advantageously used for this purpose. As a result, the light to be coupled in is advantageously introduced via a fiber end into the fiber. The fiber end in this case is mounted at a predefined distance to the focus point of the light source, which is, in particular, a laser light source, so that a divergence of the light signals, in particular, of the laser beam, is formed to match the numeric aperture of the fiber. Such a process of light coupling into a fiber is also known. A high efficiency is achieved via the light coupling into the fiber, so that only minimal optical losses are present.

It is preferably provided that the fiber is situated helically about the rotation axis. This means that the fiber passes multiple times around the rotation axis. The total light output emitted by the fiber can thus be increased. This results in an efficient utilization of the light output introduced by the light source.

The fiber emits advantageously diffusely the coupled light signals of the light source. It is also provided that the fiber emits the light signals in a homogenous manner. The diffuse, in particular, homogenous emitting of light signals by fibers is known, in particular, from the related art. A safe and reliable detection of the light signals by the receiving device is thus enabled, a safe and reliable data transmission being ensured.

In an example embodiment of the present invention, it is provided that the fiber includes a holder at least on the ring section. The holder extends annularly about the rotation axis and is situated between the rotation axis and the fiber. The holder is used to accommodate the fiber. For this purpose, the holder is advantageously designed in such a way that the holder has a shape designed to be at least in part complementary to a part of the ring section of the fiber. A surface of the holder facing the fiber is particularly advantageously mirror-coated. This results in an increase in the light output of the emitted light signals, since not only the part of the fiber that is directed away from the holder is able to emit light, but the total light emitted by the fiber is emitted radially outwardly.

In addition to the ring section, the fiber preferably includes a connecting section. The connecting section serves to connect the ring section to the light source. The connecting section can have arbitrary shapes. It is provided, in particular, that the connecting section is designed solely for guiding light to the ring section, but not for emitting light signals.

The optical interface in an example embodiment includes at least two light sources. The light sources are designed for emitting light signals at different wavelengths. In this case, it is provided that all light signals are coupled into the fiber via fiber coupling. In this way, multiple signals can be transmitted through the fiber simultaneously. Multiple receiving devices, in particular, are present, each receiving device being designed to receive light signals at one of the wavelengths. Alternatively, a single receiving device is present, which includes a plurality of different filters, each filter being assigned one of the wavelengths. The number of light sources is not limited in principle. Thus, the optical interface enables an arbitrary expansion of the data transmission capacity, should this be necessary for a specific individual application.

The receiving device advantageously includes an optical system. Light signals emitted by the fiber are projectable via the optical system onto a receiver. Thus, a maximum light output is projected onto the receiver, so that the receiver is able to safely and reliably extract signals from the received light. This enables a lossless, interference-free and, in particular, rapid data transmission.

The receiving device preferably includes a single point detector. The point detector is attachable to a system in a space-saving manner, thus decreasing the total installation space requirement for the optical interface. The ring section of the fiber ensures that the point detector is able to receive light signals from the fiber at any time.

The fiber preferably has a diameter of a maximum of 5 mm, in particular, of a maximum of 1 mm. Thus, the optical interface can be designed in a very space-saving manner, as a result of which the optical interface is suitable, in particular, for use in LIDAR macro-scanners. A minimum volume of the LIDAR macro-scanners is desirable, in particular, when using such LIDAR macro-scanners in vehicles. Such a low volume can be achieved via the optical interface, it being simultaneously ensured that data are able to be safely and reliably transmitted between a moving part and a stationary part.

An example embodiment of the present invention is directed to a system, in particular, a LIDAR macro-scanner. The system includes a stator and a rotor, the rotor being rotatable relative to the stator about a rotation axis. The system also includes an optical interface as previously described. The receiving device is attached to the stator. The receiving device is therefore stationary. The fiber, in turn, is situated on the rotor, so that the fiber is rotatable, together with the rotor, about the rotation axis. The ring section of the fiber is advantageously designed opposite the receiving device. An arrangement occurs, in particular, in such a way that the receiving device is always situated opposite an area of the ring section of the fiber. Thus, the receiving device is able to receive light signals from the fiber at any time, regardless of whether or how fast the fiber, together with the rotor, rotates about the rotation axis. This means that a safe and reliable data transmission between the rotor and the stator is enabled, the aforementioned data transmission taking place in a contactless and thus wearless manner.

Example embodiments of the present invention are described in detail below with reference to the accompanying drawings.

DETAILED DESCRIPTION

Figure 1:
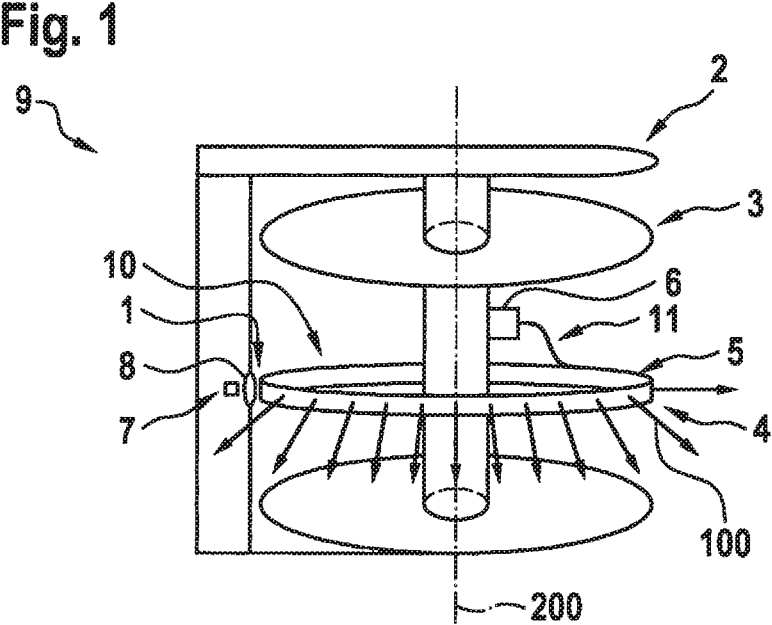
FIG. 1 is a schematic illustration of a system including an optical interface according to a first example embodiment of the present invention.

FIG. 1 schematically shows a system 9, including an optical interface 1 according to a first example embodiment of the present invention. System 9 includes a rotor 3 and a stator 2. Rotor 3 is rotatable with respect to stator 2 along a rotation axis 200. System 9 is, for example, a LIDAR macro-scanner.

Optical interface 1 is used for transmitting data between rotor 3 and stator 2. For this purpose, a receiving device 7, 8 is attached to stator 2. Receiving device 7, 8 is stationary and is not movable on stator 2. Attached to rotor 3 is a fiber 4 that, together with rotor 3, rotates about rotation axis 200.

Fiber 4 includes a ring section 10, which extends annularly about rotation axis 200. Ring section 10 is situated opposite receiving device 7, 8, so that a section of ring section 10 is always situated opposite receiving device 7, 8 during rotation of rotor 3, and thus fiber 4, about rotation axis 200. Light signals 100 can be emitted radially by fiber 4, in particular, from ring section 10, so that these light signals 100 are able to be received by receiving device 7, 8. The previously described structure of rotor 3 with fiber 4 ensures that a receiving of light signals 100 by receiving device 7, 8 is possible at any time. This is made possible, in particular, by the presence of ring section 10. Thus, a transmission of signals between rotor 3 and stator 2 is always enabled, regardless of a rotation of rotor 3 about rotation axis 200.

Light signals 100 emitted from fiber 4 are generated by a light source 6. Light source 6 is connected to ring section 10 of fiber 4 via a connecting section 11 of fiber 4. Light source 6 is also configured to couple light via fiber coupling into connecting section 11. This means that the fiber end at connecting section 11 of fiber 4 is mounted at exactly the correct distance relative to the focus point of the light of light source 6, so that the divergence of the light of the light source matches the numerical aperture of fiber 4. The light of light source 6 is therefore highly efficiently coupled into the fiber.

Light source 6 is advantageously a laser light source, which is designed to emit a laser beam. The distance of the fiber end to the focus point of the laser beam is therefore appropriately selected.

Data is thus transmitted via annularly emitted light. The light is emitted, in particular, homogenously and diffusely by fiber 4. Light signals 100 thus generated can be detected by receiving device 7, 8, as a result of which the data transmission is ensured. The light signals advantageously include shortwave, visible light.

The data transmission is advantageously coded bitwise via a pulse width modulation. In these cases, only the pulse frequency and/or an on/off-time of light source 6 is/are varied. One alternative is the transmission of data via various intensity levels of light source 6.

Receiving device 7, 8 can be freely placed on stator 2 in the area of ring section 10 of fiber 4. Receiving device 7, 8 advantageously includes a photodiode for collecting the emitted light, i.e., for receiving light signals 100. The transmittable data rate is related mainly to the pulse frequency, i.e., to the activation, light source 6, and the bandwidth of receiving device 7, 8.

Receiving device 7, 8 advantageously includes an optical system 8 and a receiver 7. Optical system 8 in this case is optional and is used, in particular, for focusing light signals 100 onto detector 7. Detector 7, as previously described, can advantageously be a photodiode.

Figure 2:
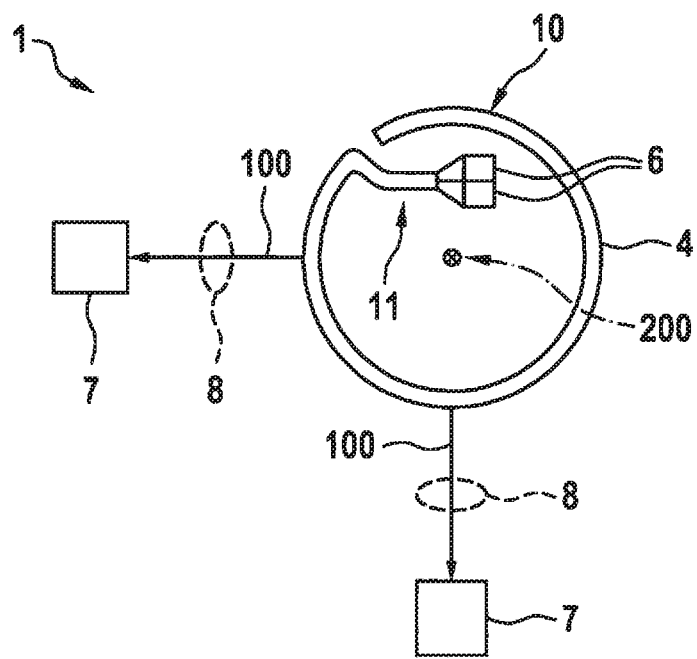
FIG. 2 is a schematic illustration of an optical interface according to a second example embodiment of the present invention.

FIG. 2 schematically shows an optical interface 1 according to a second example embodiment of the present invention. The basic structure in this case is identical to the first example embodiment, except that multiple light sources 6 are used in order to couple light into fiber 4. In this case, it is provided that each light source 6 emits light at a different wavelength. Multiple receiving devices 7, 8 are also present, each of receiving devices 7, 8 being designed for detecting light at different wavelengths. This makes it possible to carry out two data transmissions separately from each other via the same interface. Optical interface 1 is thus able to transmit multiple, independent data streams so that optical interface 1 can be flexibly adapted to current individual applications.

Figure 3:
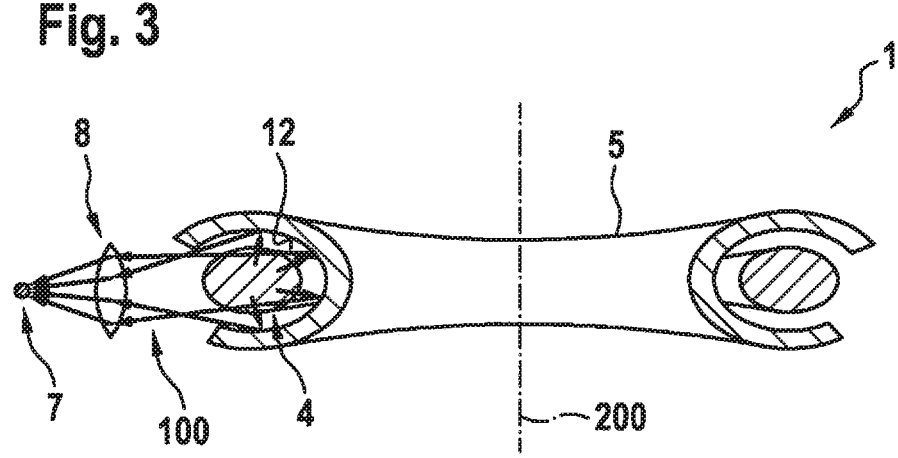
FIG. 3 is a schematic sectional view through an optical interface of the first or second example embodiments, according to an example embodiment of the present invention.
Figure 4:
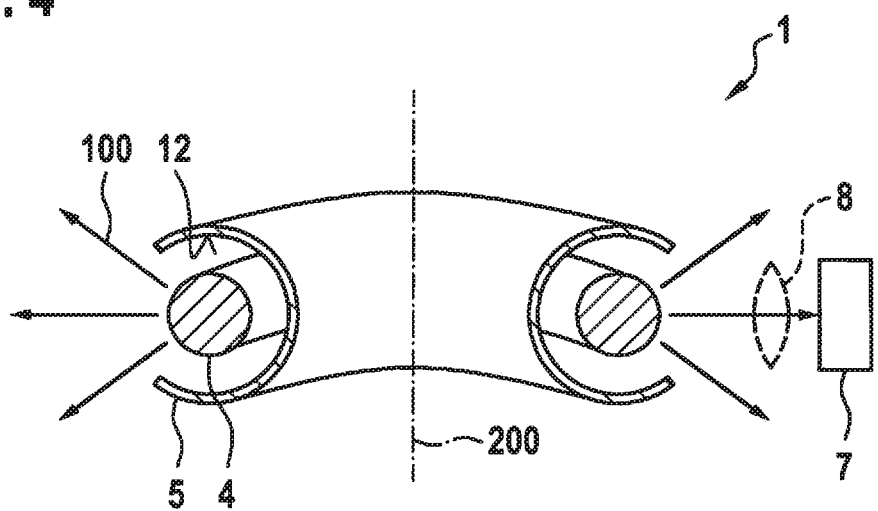
FIG. 4 is a schematic sectional view through an optical interface of the first or second example embodiments, according to another example embodiment of the present invention.
Figure 5:
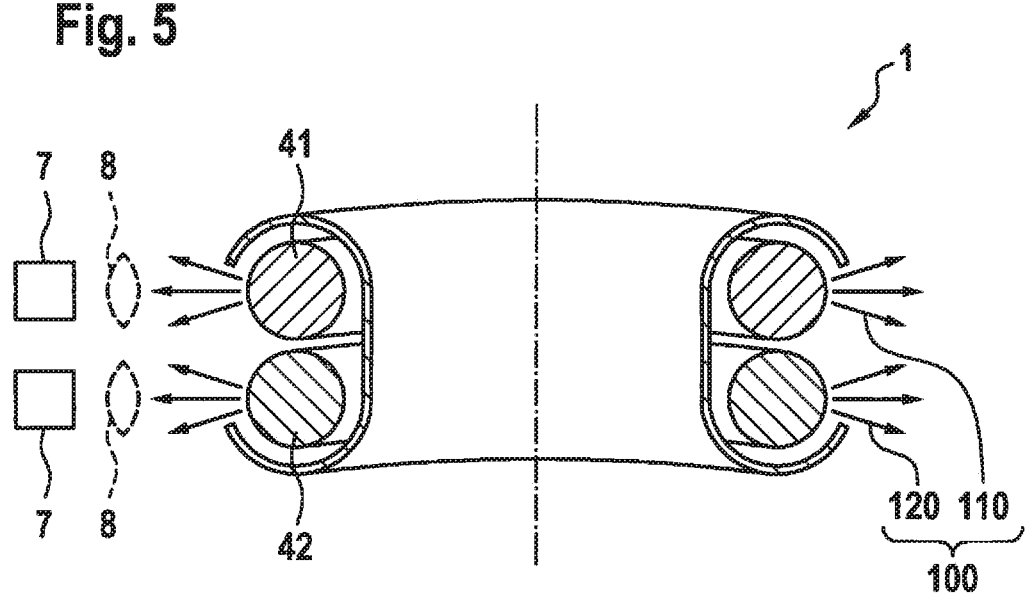
FIG. 5 is a schematic sectional view through an optical interface of the first or second example embodiments, according to another example embodiment of the present invention.

FIGS. 3-5 show various alternatives in the design of fiber 4 for the first example embodiment and second example embodiment of the present invention. Common to all alternatives is the fact that fiber 4 is held by a holder 5. Holder 5 extends annularly about rotation axis 200 and is situated between rotation axis 200 and fiber 4. Holder 5 advantageously surrounds fiber 4 at least in part, so that light signals are emitted merely radially outwardly, i.e., away from rotation axis 200.

In the first alternative shown in FIG. 3, a surface 12 facing fiber 4 is mirror-coated. This means that all light emitted by fiber 4 is able to reach receiving device 7, 8. In this case, receiving device 7, 8 preferably includes an optical system 8, in order to guide all light to detector 7. Thus, an optimal light yield takes place, as a result of which the light output generated by light source 6 is optimally utilized.

FIG. 4 shows a second alternative. In contrast to the first alternative, no mirror-coating of surface 12 facing fiber 4 is provided here. Thus, only a part of the light output emitted by fiber 4 is usable for receiving device 7, 8. An optical system 8 can optionally be present, but is not required. The second alternative can therefore be manufactured very simply and with little effort.

FIG. 5 shows a third alternative, in which a first fiber 41 and a second fiber 42 are present. First fiber 41 and second fiber 42 are designed analogously to previously described fiber 4. Thus, it is provided that emitted light signals 100 include first light signals 110 and second light signals 120, first light signals 110 being emitted by first fiber 41, whereas second light signals 120 are emitted by second fiber 42. First light signals 110 advantageously have wavelengths differing from second light signals 120. It is provided that receiving devices 7, 8 are present for each of different light signals 100. On the one hand, therefore, a receiving device 7, 8 is present in order to receive first light signals 110; on the other hand, another receiving device 7, 8 is present in order to receive second light signals 120. Alternatively, a single receiving device 7, 8 can also be present, receiving device 7, 8 including different filters for differentiating between first light signal 110 and second light signal 120.

First fiber 41 and second fiber 42 can alternatively also be in each case a separate ring section 10 of a single fiber 4. In this case, the amount of light emitted by the fiber is increased, as a result of which the light output generated by light source 6 is efficiently utilized.

Figure 6:
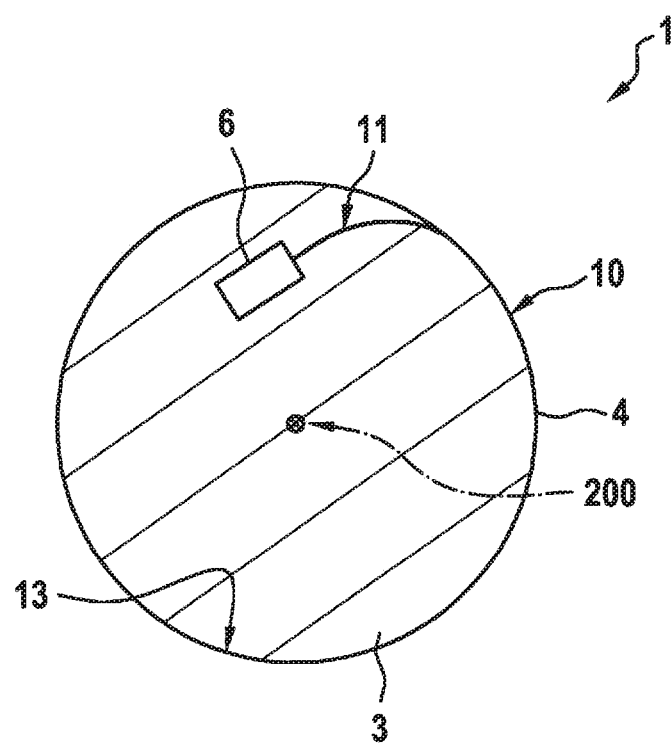
FIG. 6 is a schematic illustration of a part of an optical interface according to a third example embodiment of the present invention.

FIG. 6 shows a subsection of an optical interface 1 according to a third example embodiment of the present invention. In this embodiment, only fiber 4 is shown, which is attached to rotor 3. Fiber 4 is mounted directly on a rotor bottom of rotor 3, the fiber 4 being situated in such a way that each section of the rotor periphery is covered by fiber 4. Rotor 3 for this purpose includes a groove 13, in which fiber 4 is attached. A particularly space-saving arrangement is achieved in this way.

In all example embodiments, it is possible to alternatively position fiber 4 on stator 2 and receiving device 7, 8 on rotor 3. This results in an inverse data transmission direction, all other described features and advantages remaining unchanged.

The present invention includes, for example, the following advantages:

- The optical interface is very light in terms of its weight (advantageous on a rotating system).
- The diffuse emission of the fiber is due to the scattering of light on objects, thus, no time delay occurs as, for example, in the case of phosphorescence or fluorescence. Additionally, light is emitted and irradiated at the same wavelength (no conversion toward longer wavelengths=loss of energy).
- A wearless data transmission is possible (no contact between components).
- An interference-free, rapid data transmission (speed of light c=3.0*108/ms in a vacuum, marginally slower in fibers) is possible.
- The light carrying the information can be coupled into the fiber with almost no loss; this results in more efficient utilization of the electrical power introduced into the light source.
- The power emitted by the fiber can be further increased if the fiber is wrapped multiple times around the rotor; this results in more efficient utilization of the electrical power introduced into the light source.
- The fiber has a small minimal bending radius, i.e., it can be adapted to arbitrary contours in the rotor. This makes a small rotor having a radius, in particular, <5 cm possible.
- The light source of the transmitted light can be arbitrarily positioned on the rotor, since a fiber coupling can be used.
- The receiver can be advantageously positioned on the stator.
- The fiber can also be positioned on the stator and the receiver on the rotor (inverse data transmission direction).
- The receiver can be a single point detector.
- Multiple receivers can also be used.
- The manufacturing can be done cost-effectively ("drawing fibers").
- The optical interface is very light in terms of its weight (advantageous on a rotating system).
- The optical interface can be designed very narrow, i.e., space-saving in the radial direction, since the fiber has a diameter of <1 mm.
- Multiple signals can be transmitted ("fiber multiplexing") in parallel via the fiber (medium).
- Multiple fibers can be situated physically one above the other (macroscopic "fiber multiplexing").

What is claimed is:

1. An optical interface comprising:
    a receiver;
    a light-conducting fiber that includes a ring section that extends annularly about a rotation axis; and
    at least one light source, wherein:
        the at least one light source is configured to emit light signals into the fiber via a fiber coupling;
        the fiber is configured to radially emit the light signals emitted by the light source; and
        the receiver is configured to receive the light signals radially emitted by the fiber.

2. The optical interface of claim 1, wherein the fiber is situated helically about the rotation axis.

3. The optical interface of claim 1, wherein the fiber is configured to perform the radial emission of the light signals diffusely.

4. The optical interface of claim 1, further comprising:
    at least on the ring section, a holder that (a) extends annularly about the rotation axis, (b) is situated between the rotation axis and the fiber, and (c) includes a mirror-coated surface that faces the fiber.

5. The optical interface of claim 1, wherein the fiber includes a connecting section that connects the light source and the ring section.

6. The optical interface of claim 1, wherein the at least one light source includes two or more light sources configured to emit the light signals that are emitted into the fiber via the fiber coupling at different wavelengths.

7. The optical interface of claim 1, further comprising optics via which the light signals are projectable onto the receiver.

8. The optical interface of claim 1, wherein the receiver includes an individual point detector.

9. The optical interface of claim 1, wherein the fiber has a diameter of a maximum of 5 millimeters.

10. The optical interface of claim 1, wherein the fiber has a diameter of a maximum of 1 millimeter.

11. A system comprising:
    a stator;
    a rotor; and
    an optical interface that includes:
        a receiver situated on the stator;
        a light-conducting fiber (a) that includes a ring section that extends annularly about a rotation axis and (b) that is situated on the rotor so that the rotor and the fiber are rotatable about the rotation axis; and
        at least one light source;
    wherein:
        the at least one light source is configured to emit light signals into the fiber via a fiber coupling;
        the fiber is configured to radially emit the light signals emitted by the light source; and
        the receiver is configured to receive the light signals radially emitted by the fiber.

12. The system of claim 11, wherein the system is a LIDAR macro-scanner.

* * * * *